INVENTORS
WILLIAM H. SOLOMON
DONALD J. VAN WEELDE
CARREL M. FORWARD
BY
ATTORNEYS

INVENTORS
WILLIAM H. SOLOMON
DONALD J. VAN WEELDE
BY CARREL M. FORWARD

ATTORNEYS

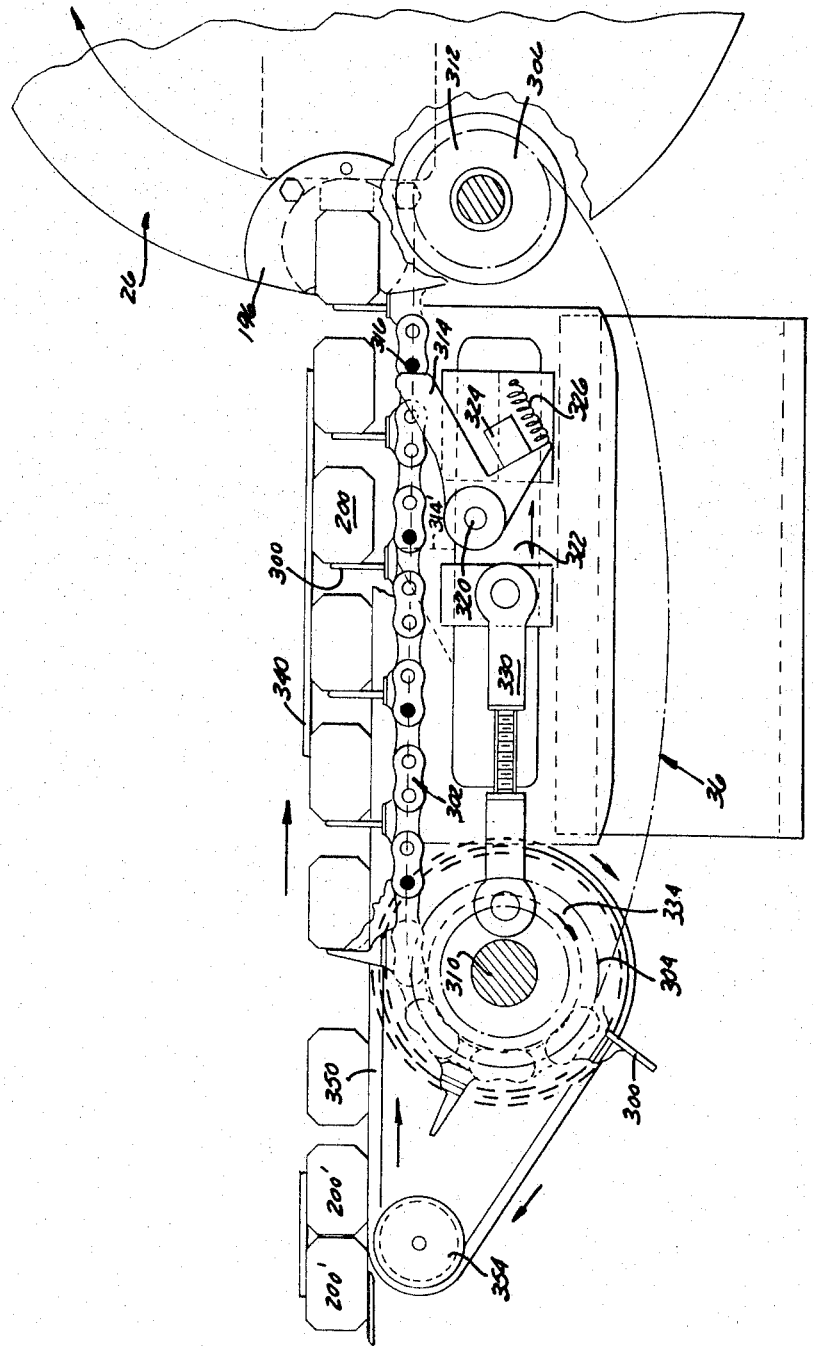

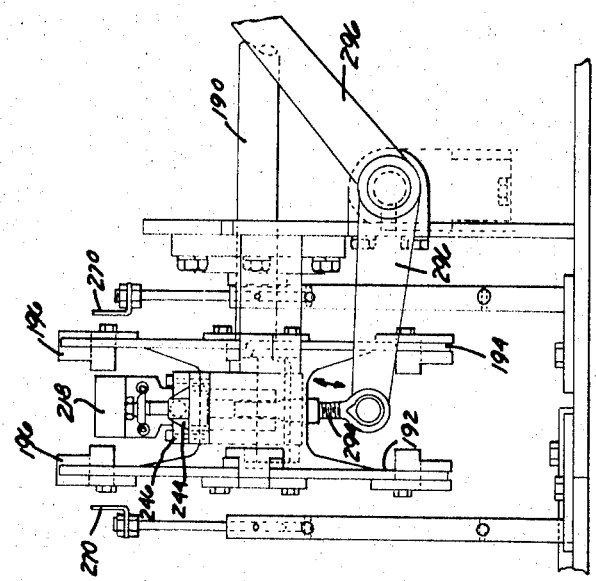
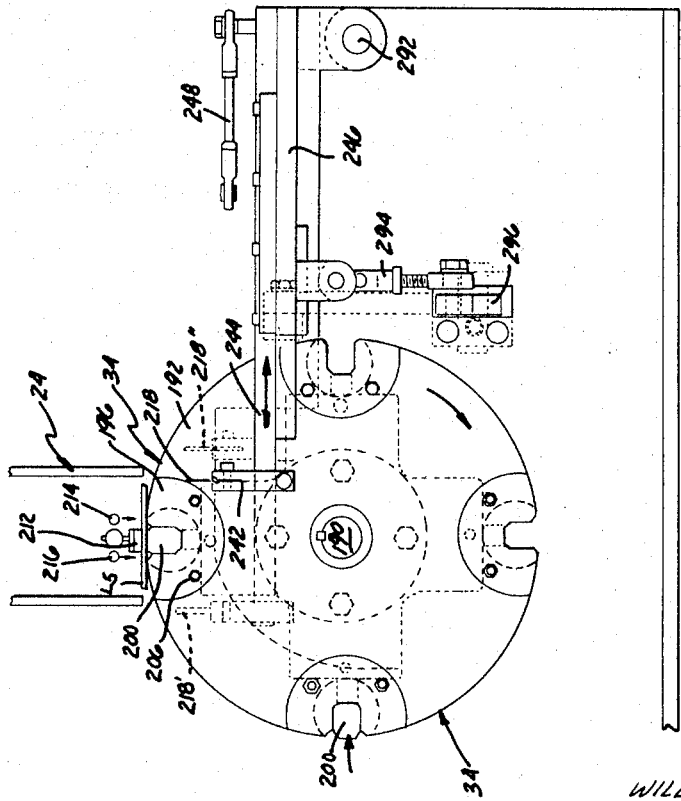

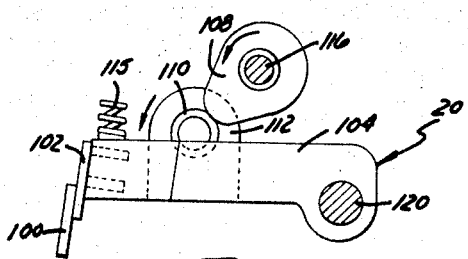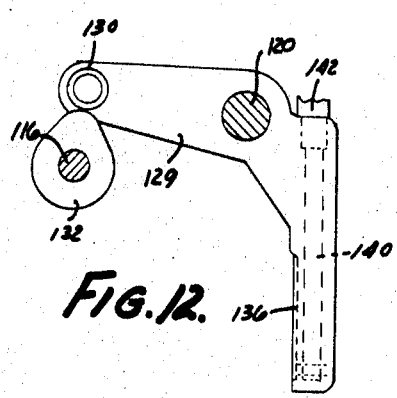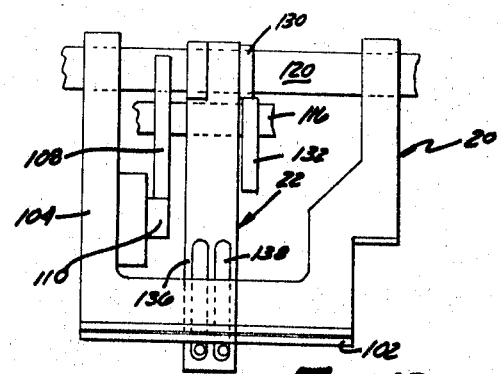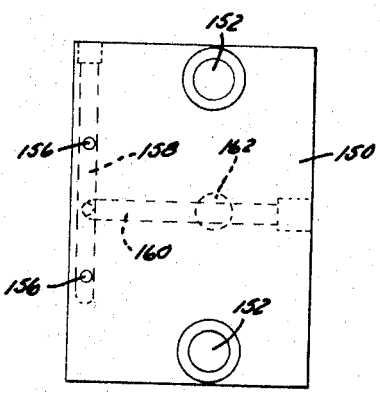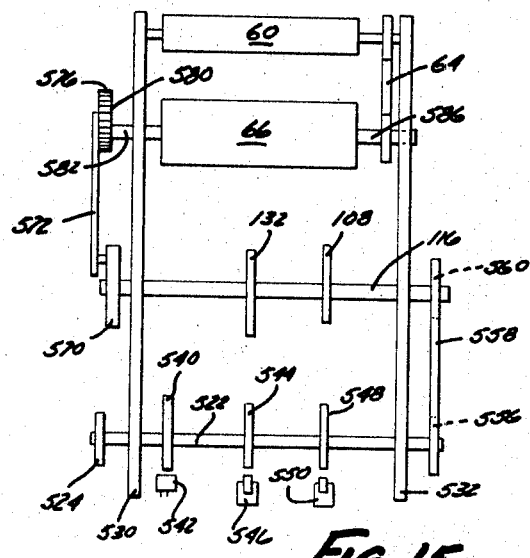

United States Patent Office 3,451,874
Patented June 24, 1969

3,451,874
LABELING MACHINE
William H. Solomon, Grand Rapids, Donald J. Van Weelde, Coopersville, and Carrel M. Forward, Grand Rapids, Mich., assignors to Oliver Machinery Company, Grand Rapids, Mich., a corporation of Michigan
Filed Oct. 21, 1965, Ser. No. 500,047
Int. Cl. B26d 5/38; B65c 9/02
U.S. Cl. 156—354                    16 Claims

ABSTRACT OF THE DISCLOSURE

A labeling machine for controllably cutting individual labels from a repeat pattern tape, transferring the labels from the cut off to an applicator, and accurately applying the labels to individual advanced articles, the transfer and article advancing machine components being intermittently driven to be stationary during transfer and application.

---

This invention relates to a labeling machine, and more particularly to apparatus capable of extremely accurate label application on surfaces, particularly surfaces of individual articles, at relative high output rates.

Labels to be individually applied to surfaces of articles or of a web are conventionally formed by printing a repeat label pattern on a continuous tape, forming indexing means such as notches or slits at intervals in the tape, severing the tap into individual labels by using the registry of the indexing means on index wheels, and adhering the individual labels to the articles, web, or other appropriate surfaces to be labeled. Although the type of printing employed may vary considerably, printing techniques such as rotogravure are preferably employed because of the resulting accuracy of printing.

However, even though the tape is very accurately printed, obtaining high accuracy of application of the individual labels on the surfaces to be labeled is extremely difficult to obtain with present equipment. Tolerances of label application cannot be guaranteed to be very close with present machines. One particular area where loss of registry can become acute is between the printing and notching operations, or during the notching operation. Also, loss of accuracy can occur by slight variations in registry between the printing and label cutting operations, or between the label cutting and label application operations, or both. The problem of loss of registry is particularly acute during transfer of the labels from one handling component of the equipment to another.

Further, since registry of label tape to the cutter is conventionally regulated by passage of notches, punches or slits in the tape over index wheels, every change in length of label to be applied requires substitution of an index wheel or wheels which are exactly preformed to suit that particular length. Even then, initial adjustment of the index wheel with cutter, for example, presents a substantial task. And if the tape goes out of registry during operations, readjustment can only be effectively achieved with shut-down of the equipment and tedious start and stop, trial and error techniques.

Even if registry of the tape is somehow maintained, accuracy of positioning of the individual labels severed from the tape onto articles to be labeled is presently quite limited, in both dimensions of the label, with present equipment. Of course, in pursuing accuracy of label application, the economical factor of reasonably high production output must be maintained. This therefore involves correlation of rapidly advanced articles with rapidly advanced individual label sheets sliced from a continuous tape. The nature of the label sheets themselves, made adhesive, causes them to be tricky items to handle, advance, and apply in accurate fashion.

It is an object of this invention to provide label applying equipment capable of extremely high accuracy of label application to the surfaces, coupled with high production output.

Another object of this invention is to provide a label handling and applying machine that receives labels in the form of a repeat pattern continuous tape, accurately controls the registry of the tape, accurately severs the individual labels from the tape, accurately feeds and controls articles to be labeled, and accurately advances, heats to an adhesive state, and applies the individual labels in exact alignment in both of its dimensions to the surfaces to be labeled, in a rapid, high production manner.

Another object of this invention is to provide a label tape feeding and cutting, and label advancing, handling, and applying apparatus capable of exactly positioning both labels and articles on cooperative revolving hub and wheel devices so that the labels are properly heated to an adhesive condition and applied in an exactly controlled and aligned manner in relation to the individual articles.

Another object of this invention is to provide a novel label applicator machine having a label tape feed and control system enabling instant and exact initial adjustment of label tape registry to the cutter, enabling instant adjusment of the tape registry during operation of the machine, at any time; enabling different size labels to be readily and automatically accommodated without change of indexing wheels or the like. Control of registry can be adjusted merely by adjusting a knob. Further, the machine is capable of handling different style or width labels easily, with registry being set up on any desired print pattern segment of the label by mere turning of a knob, to accurately control and advance the tape without tape notching, slitting or the like. These adjustments of the label feed control and label portion to be used as a control parameter can be made almost instantly while the machine is in full operation, enabling extremely accurate adjustment control of the label tape registry with the cutter and the individual articles.

Another object of this invention is to provide a novel label applying apparatus having a special label handling and transfer system retaining control of positioning of the individual cut labels from the cut off station to a revolving heater means, and to applicator means. Moreover, the label advancing means has special rotational label heating and positioning means enabling complete and proper heating to a proper adhesive condition during advancement between the cut off station and the applicator station, while also achieving exact alignment control by use of the label heating advancer.

Another object of this invention is to provide a labeling machine having a unique feed system for the articles to be labeled, enabling exact article positioning and advancing timing to the applicator station enabling extremely accurate control over both the articles and the labels during label application, and effecting controlled discharge of the labeled articles from the label applicator station, even elongated articles.

Another object of this invention is to provide a novel label feed and applicator machine that achieves accuracy of label application by having cooperative components which transfer the labels therebetween during time intervals when the components are brought to a controlled stand still, yet without sacrificing high production output.

These and other objects of this invention will become apparent upon studying the following specification, in conjunction with the drawings in which:

FIG. 6 is an enlarged, partial, front elevational view of the left end of the assembly in FIG. 1, showing the article advancing means;

FIG. 7 is a fragmentary, front elevational view of the article positioning and label applicator means of the assembly;

FIG. 8 is an end elevational view taken from the right end of the assembly in FIG. 7;

FIG. 11 is a side elevational view of the label cut off means and its operating cam;

FIG. 12 is a side elevational view of the transfer arm means and its operating cam;

FIG. 13 is a plan view of the assembled cut off means and transfer arm means in FIGS. 11 and 12, taken down in the direction indicated by the arrow XIII in FIG. 4;

FIG. 14 is a plan view of one of the flat heater blocks or plates on the hub assembly in FIG. 9; and FIG. 15 is a plan, somewhat schematic view of a portion of the label tape feed subassembly.

Figure 1:
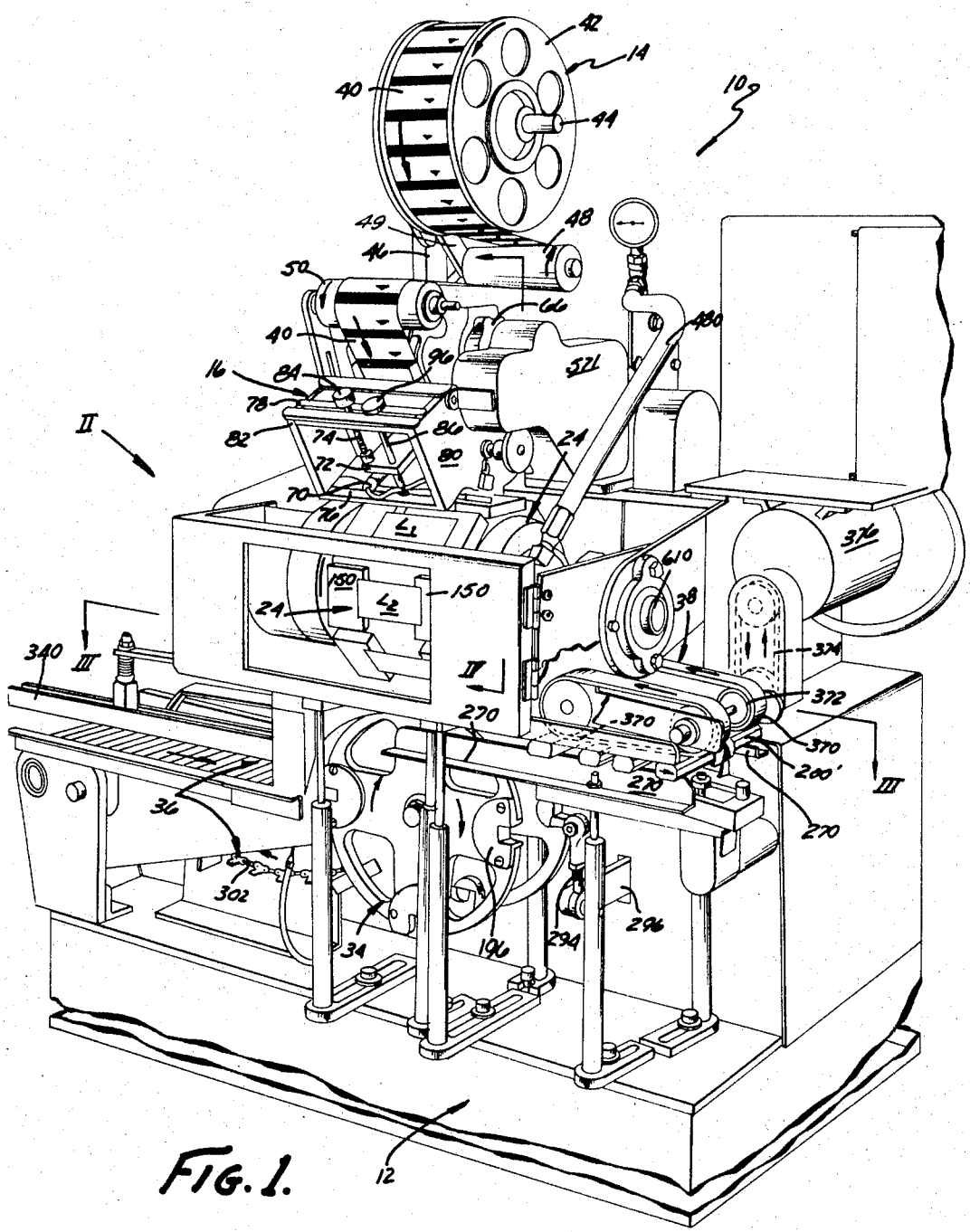
FIG. 1 is a perspective view of the front and one end of the novel labeling machine.

Referring now specifically to the drawings, the complete labeling machine assembly 10 includes supporting framework and housing subassembly 12, reel type label tape supply means 14, photoelectric label tape sensing control means 16 to control tape feed and label cut off, label tape feed means 18 (FIG. 4) controlled by means 16, label tape cut off means 20 (FIG. 4), transfer arm means 22 from the label cut off means or station to a revolving label heating and positioning drum subassembly 24, label applicator subassembly 26 (FIG. 5) for receiving individual heated labels from drum subassembly 24 and applying them to individual positioned articles, article positioning wheel means 34 for label application, article advancing subassembly 36 (FIG. 3) to the wheel means 34, and article discharge means 38 (FIG. 1). Each of these is described in detail hereinafter, as are the several drive means to these various subassemblies.

The housing and supporting framework subassembly 12 basically includes suitable supporting framework to support all of the operative components, and lower housing enclosure means which encompasses the main drive motor and drive train arrangements. The article advancing means, label tape feeding, cutting and applicator means, and labeled article discharge means are mounted platforms on top of the housing, as illustrated generally in FIG. 1.

In conventional fashion, the individual labels are printed in repeat pattern on a continuous tape 40 by any selected printed technique, preferably rotogravure. The back side of the tape or portions thereof, is coated with heat responsive adhesive. The tape is then wound on a reel 42.

The tape is pulled from the reel on the labeling machine by having the reel mounted on a shaft 44 supported above the assembly by any suitable support means such as upright support 46. The tape is pulled around guide rollers 48 and 50, in a predetermined path, past photoelectric sensor control subassembly 16, by a pair of counter rotating, engaging friction rollers 60 and 62 of tape drive means 18. Roller 48 is mounted on swinging arm 49 (FIG. 1) that is spring loaded to maintain the tape taut. It also releases the brake on reel 42 in conventional manner to allow unwinding. Drive rollers 60 and 62 are horizontally oriented and powered. Roller 60 is driven by a belt 64 which is driven by the output end of an electrically actuated, magnetic clutch-brake unit 66 (FIGS. 1 and 15) of the conventional type to cause intermittent drive of the rollers, for example, like that shown in U.S. Patent No. 3,208,566. Rollers 60 and 62 have intermeshing spur gears (not shown) to cause both to be positively driven for optimum tape feed control.

The specific drive mechanism to the input side of this magnetic brake-clutch unit 66 will be described hereinafter.

Photoelectric sensor and control means 16 includes an elongated photoelectric sensor element 70 (FIGS. 1 and 4) oriented toward the passing tape 40, immediately upstream of pulling cylinders 60 and 62. This sensor is mounted to the underside of a support plate 72. The plate is threadably connected to a threaded shaft 74 that is parallel to the longitudinal dimension of the adjacent label tape 40. This shaft 74 is rotationally secured on its ends to upper and lower parallel bars 76 and 78 having their ends secured to vertical support plates 80 and 82. An adjustment knob 84 on the upper end of shaft 74 enables the shaft to be rotated, to vertically threadably adjust support 72 along the shaft, and thus adjust sensor 70 longitudinally along the adjacent tape, as illustrated by the dotted line and phantom line positions of the plate and sensor in FIG. 4. This allows adjustment of the relation between the feeding and cut off operations to cause exact severing of individual labels from the label tape. This is described more fully hereinafter. The sensor is also adjustable across the width of the tape 40 since support plate 72 also has a second shaft 86 forming a sliding fit therewith. This shaft 86 has a pair of spur gears 88 and 90 (FIG. 4) adjacent its upper and lower ends, intermeshed with a pair of transverse gear racks 92 and 94 respectively, across the width of the label tape path. Thus, rotation of knob 96 on the upper end of shaft 86 causes travel of the spur gears along the gear racks, to shift the sensor transversely across the width of the label tape. This adjustment enables the sensor to be selectively associated with any particular printed portion at any particular section of the label across its width, for optimum control.

Figure 4:
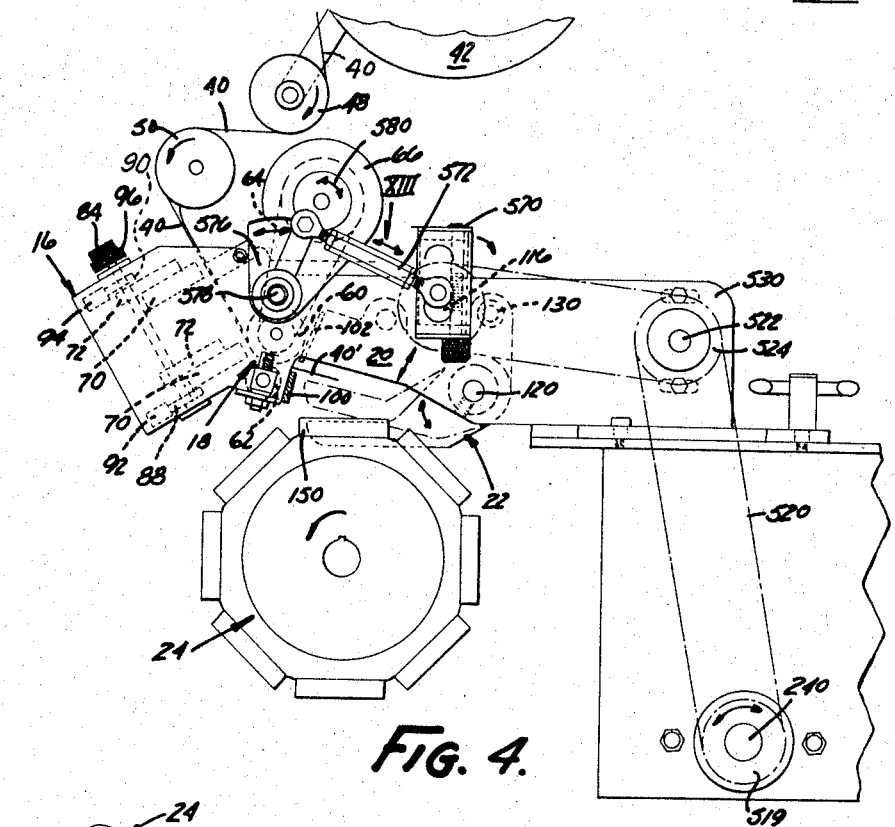
FIG. 4 is a partial elevational view of the upper portion of the assembly, taken generally on the section plane IV—IV of FIG. 1.

The free end 40' (FIG. 4) of tape 40 is repeatedly severed just beyond rolls 60 and 62 to sever the adjacent repeat printed sections into individual labels to be heated for adhesiveness, and applied to articles. The severing operation is achieved vertically reciprocating one blade of cut off mechanism 20 along the other blade to cause a shearing operation. Specifically, shiftable blade 102 mounted to the end of an oscillating arm 104, moves past fixed blade 100 (FIGS. 4 and 11). This arm 104 is mounted on a pivot shaft 120 at one of its ends. It is pushed down to shear by a rotating cam 108 engaging cam follower 110 on upstanding boss 112 of arm 104, and retracted upwardly by a tension spring 115 connected to arm 104 and support means above it. The cutting edge of blade 102 is preferably tilted so that lowering of blade 102 from the raised position shown in FIG. 4, to the lowered position shown in FIG. 11, causes blades 100 and 102 to shear a label similar to a scissor action. Arm 104 is actually a U-shaped member as shown in FIG. 13, having the two free ends of the legs of the U mounted on pivot shaft 120. Blade 102 is mounted on the outer face of the cross leg of the U. This same pivot shaft 120 also supports the transfer arm subassembly 22.

More specifically, the transfer arm subassembly 22 is basically an elongated generally L-shaped or dog leg member 129 as shown most clearly in FIGS. 4 and 12. It is mounted intermediate its ends on pivot shaft 120. It has a cam follower 130 attached to its upper end, and engages a rotational cam 132 mounted on cam shaft 116. The lower, generally horizontally extending leg member 129 includes an upper, flat, label retention surface area 136 which includes a plurality of evacuation depressions 138 (FIG. 13) communicating through suitable passages 140 and vacuum hose connection 142 (FIG. 12) to evacuation means to be described for holding a cut label to the surface. The vacuum or negative pressure is applied when the arm is in the upper position as shown in phantom lines in FIG. 4, to pick up and retain a severed label, and is released in the lowered position of the arm as shown in solid lines in FIG. 4, where the label is transferred to a pair of arm straddling heater and retainer plates 150 mounted on the periphery of rotational, intermittently moving, label advancing and positioning drum subassembly 24.

Figure 9:
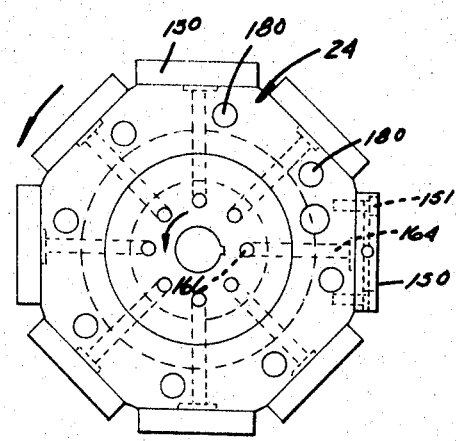
FIG. 9 is an end elevational view of the advancing, heating, and positioning hub subassembly for the individual labels.
Figure 10:
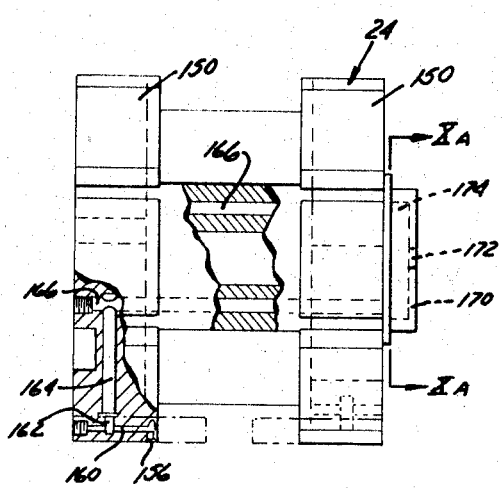
FIG. 10 is a front elevational view of the hub subassembly in FIG. 9.

A plurality of these cooperative spaced pairs of flat plates are mounted in a peripheral pattern around the drum as shown in FIGS. 1, 9 and 10. These retain and heat the edges of severed labels as they are intermittently advanced through successive positions in the manner indicated by labels L1 and L2 etc. in FIG. 1. The plates are mounted to the hub by bolts 151 (FIG. 9) extending through bolt holes 152 (FIG. 14). The spacing between the plates in each pair can be varied (as shown by the variation shown in phantom lines in FIG. 10) to suit the particular width of label encountered, by substituting differing length plates.

Along the inner edge portions of the plates is a plurality (here three) of surface vacuum ports 156, communicating through passage 158 (plugged on its end), passage 160 (plugged on its end), and outlet port 162 into the drum passages 164 which extend radially to axial passages 166. Passages 166 in the rotating drum communicate with the vacuum source through a fixed control valve plate 170 mounted on one end of the drum so that vacuum is applied to each pair of heater plates 150 only from the twelve o'clock label pick-up position on the drum to the six o'clock label release position. Specifically, the drum rotates in the rotational direction indicated by the arrows in the several figures, with label transfer occurring from transfer arm means 22 to one pair of plates in the twelve o'clock position, with vacuum being initially applied to these plates in the twelve o'clock position to hold the label edges. The label is retained on that pair and the edges are heated as the drum moves intermittently counterclockwise, down to the six o'clock position where the vacuum is released for application of the label to an article, as described hereinafter.

Fixed valve 170 has a vacuum inlet 172 to its internal semi-annular chamber 174 which communicates only with the shoes or plates in the twelve o'clock, ten thirty, nine o'clock, seven thirty, and six o'clock positions (as they are illustrated in FIG. 4).

The drum also contains a plurality of elongated electrical resistance heater elements 180 extending axially of the drum beneath each pair of heater plates 150 (FIG. 9). The drum is driven in intermittent fashion, a rotational step at a time, to position each pair of heater plates in the specific horizontal twelve o'clock position to receive the edges of one label from the cut off and transfer arm subassemblies. The intermittent drive motion is achieved in a manner to be described hereinafter.

Each label, after being received in the twelve o'clock position of the drum, moves through a plurality of successive stations, during which time the edges are continuously heated by the spaced heater plates, to put the label in adhering condition. The adhesive coated side of the label tape is positioned upwardly when initially cut, i.e. on the opposite face as that contacting the retaining surface of the transfer arm, and the contact surfaces of the heater shoes. I.e., the adhesive side is always oriented away from the surfaces which handle and transfer it, remaining unengaged until it contacts the actual article to which the label is to be applied. Thus, the label on the plates at the six o'clock position of the hub has its adhering side facing downwardly to be applied to an article.

Figure 5:
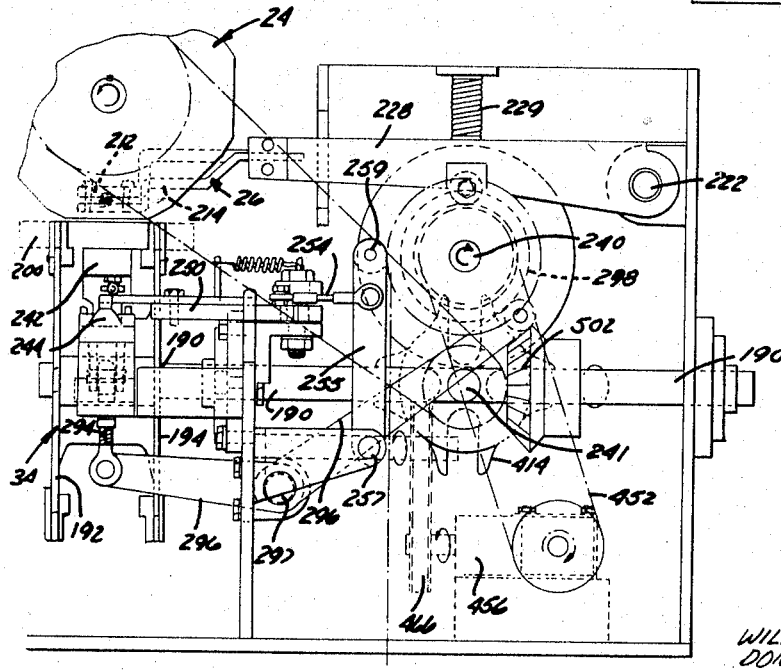
FIG. 5 is a partial end elevational view of the lower portion of the assembly in FIG. 1 taken generally from the right end of the assembly as it is shown in FIG. 1.

In the preferred form of the construction illustrated, the labels are applied to elongated containers such as toothbrush containers to label them and seal the containers. These elongated articles are fed one at a time to a controlled position immediately adjacent the six o'clock position of label drum 24, by a rotating feeder wheel subassembly 34 (FIGS. 5 and 7). This subassembly includes a rotational wheel unit mounted on drive shaft 190 (FIG. 5), and including a pair of spaced peripheral rims 192 and 194, each of which contains a plurality of article receiving, slot shoes 196 at spaced intervals around its periphery. These are aligned with each other to receive and retain the ends of the elongated article such as the toothbrush containers 200, to advance these articles from the nine o'clock position illustrated in FIG. 7 to the twelve o'clock position where the container receives the label from hub assembly 24 at its six o'clock position. The hub 24 rotates in a plane transverse to the plane of rotation of the article advancing wheel subassembly 34. I.e. their rotational axes are perpendicular to each other, so that the label which is held to the heater plates on its ends is moistened transversely across the elongated article 200 retained on its ends. There is thus a working space in the central portions of the transversely overlapping label and article. I.e., between the spaced heater plates and the spaced shoes 196 is a working space for the label applicator means 26.

The particular groove configuration of shoes 196 can be varied to suit the configuration of the articles to be labeled. They are secured in the periphery of rims 192 and 194 by bolt fasteners 206, to be substitutable. The driving motion of this article advancing wheel is intermittent, with the wheel rotating 90° each time, in the form shown, to exactly position an article with respect to the label advancing hub. Exremely accurate alignment can be obtained with the cooperation of these two intermittently moving synchronized components. The drive mechanism for shaft 190 upon which this wheel is mounted will be described more specifically hereinafter.

The particular label applicator means employs holding means, bending fingers, and wiping means which have been used in similar form on label applicators heretofore. Specifically, it includes a label holder 212 (FIG. 7) shiftable toward a container to push the center of the label, e.g., L5 against the article 200; a pair of straddling label bender fingers 214 and 216 which reciprocate down alternately to bend the ends of the label down around the sides of the article, and reciprocable underside label wiper means 218 which wipes one end of the label beneath the bottom of the article 200, and then in the return stroke (from the phantom line position 218' illustrated in FIG. 7), wipes the other end to make the complete wrap and adhesion around the article. More specifically, in the label applicator subassembly 26 illustrated in FIGS. 3 and 5, label holder 212 is mounted on one end of pivotal arm 220 having its other end mounted on pivot shaft 222. It is vertically reciprocated by a cam 224 contacting the underside of arm 220. Straddling fingers 214 and 216 are respectively mounted on the ends of arms 228 and 229 having their other ends mounted on pivot shaft 222. They are vertically reciprocated up and down by respective cams 230 and 232 contacting the underside of the arms intermediate their ends. Cams 232, 224 and 230 are mounted on the uppermost shaft 240 of the drive mechanism to be described in more detail hereinafter. The downward movement of the members is assured by biasing springs, e.g., spring 229 for arm 228 (FIG. 5).

The flexible upstanding wiper blade 218 is mounted in a holder 242 on the end of a glide bar 244 which reciprocates in a guide 246. Bar 244 is reciprocated by a connecting rod 248 having one end pivotally attached to the glide bar, and the other end pivotally connected to an L-shaped lever 250 pivoted intermediate its ends at 252. Lever 250 is reciprocated in an arcuate path about this pivot point by a crank 254 connected to an upstanding link 255 pivoted on shaft 257 on its lower end, and having a cam follower 259 engaging rotating cam 256 on shaft 240.

Figure 3:
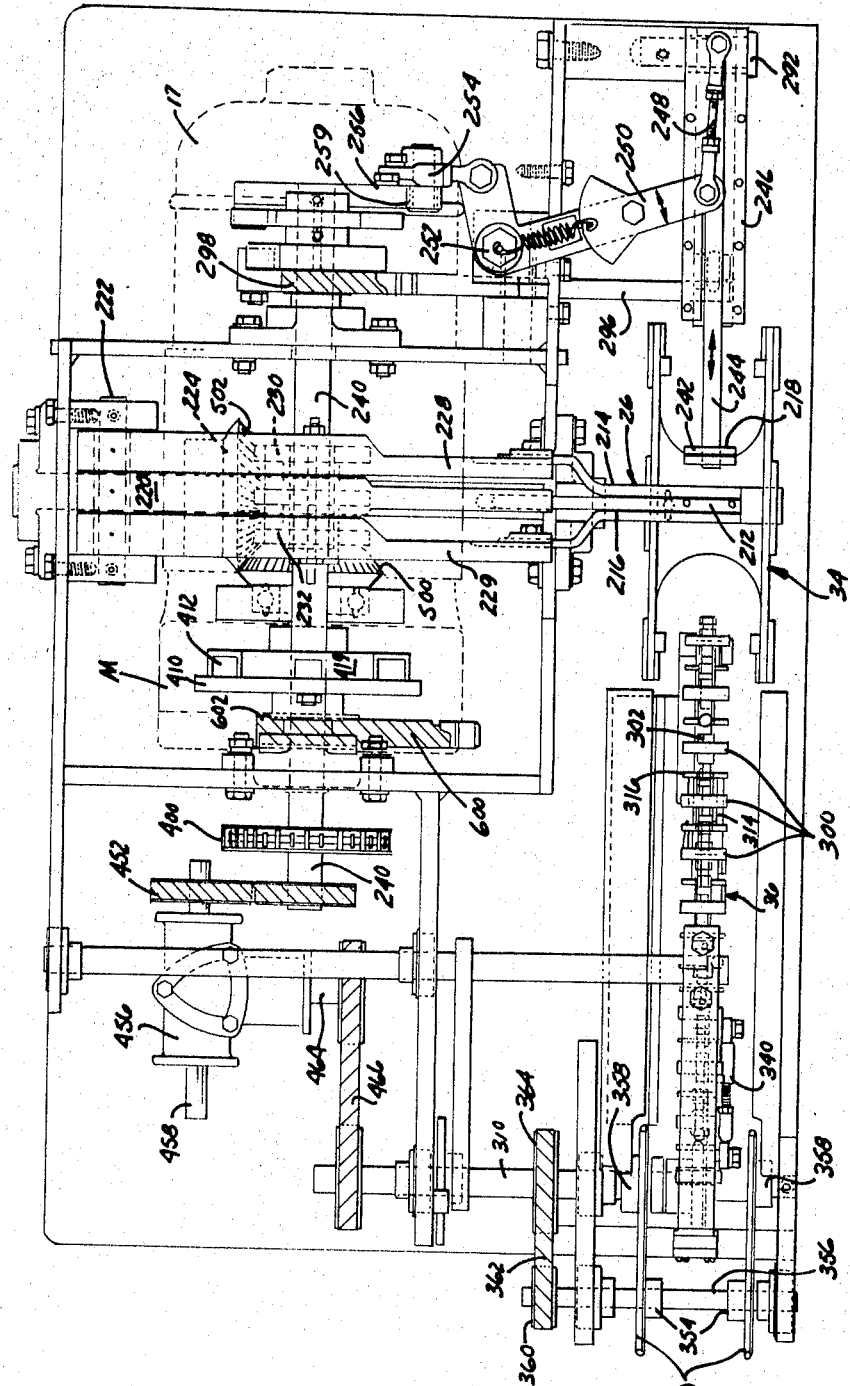
FIG. 3 is a plan view of the main drive train system for the operative components of the assembly, taken on section plane III—III of FIG. 1.

Wiper 242 has, after returning to its home position illustrated in phantom lines 218″ in FIG. 7 (and in solid lines in FIG. 3), a slight lowering action to move it out of the path of a labeled article being discharged. This vertical movement is obtained by having guide 246 mounted on an end pivot shaft 292, and lifting and lowering this guide about its pivot by a vertical connecting rod 294 attached to the underside of guide 246. The rod is vertically reciprocated by an extended pivot arm 296 mounted to pivot shaft 297 and shifted by cam 298 (FIG. 3).

The individual articles such as the elongated containers shown, are advanced to this wheel subassembly 26 by the special advancing means subassembly 36 illustrated in FIGS. 1–3 and 6. This advancing means includes a plurality of spaced, like, upstanding article pusher elements 300 mounted on a continuous recirculatory roller chain 302 which travels around a pair of spaced sprockets 304 and 306. It moves along a horizontal path, advancing articles 200 one by one in parallel relation to the nine o'clock position of receiving shoes 196 of wheel subassembly 26 (FIG. 6). Sprockets 304 and 306 free wheel on shafts 310 and 312. Advancement of the roller chain is intermittently obtained by pushing the chain with a reciprocating dog 314. The forward edge of the dog engages with laterally projecting pins 316 extending laterally from the pivots of roller chain 302 as shown by the solid colored pins in FIG. 6. Dog 314 is mounted on a pivot axis 320 to a slide 322 which is reciprocably slidably mounted to move back and forth in a horizontal path in the direction of chain advancement and return. The dog is pivoted to an advancing position against a stop 324 by a biasing tension spring 326, and is shiftable on the return movement (i.e., to the left as viewed in FIG. 6) by the tapered back side of the dog being cammed down by the next adjacent pin, and then snap up behind it (as illustrated by the dotted lines at 314′ in FIG. 6).

Figure 2:
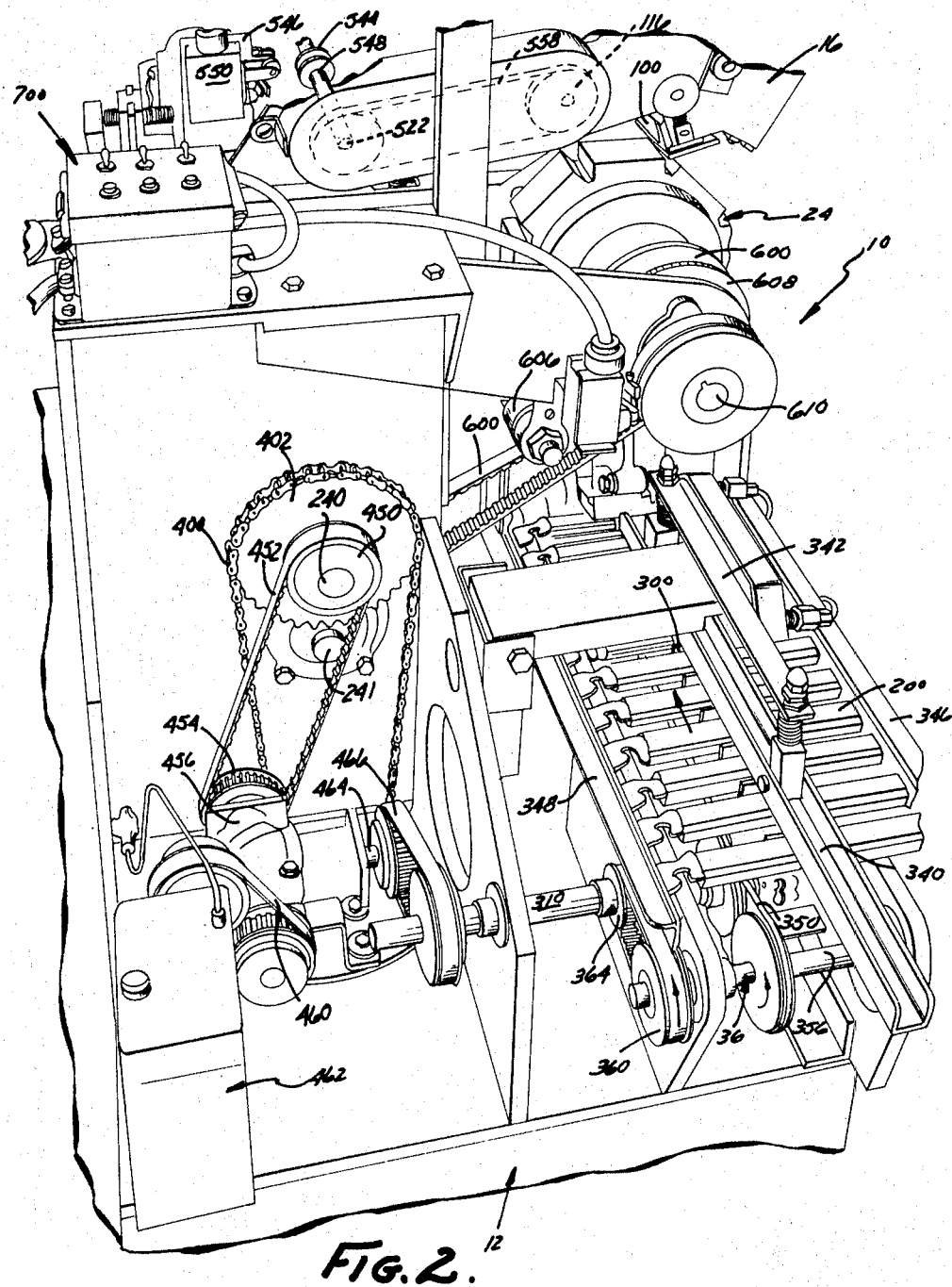
FIG. 2 is a perspective view of the opposite end of the labeling machine to that shown in FIG. 1, taken in the direction indicated generally by the arrow II in FIG. 1.

Forward and reverse movement of slide 332 is achieved by a connecting rod 330, which is pivotally secured on one end to the slide and rotationally attached eccentrically to a revolving hub 334 keyed to shaft 310. Thus, power rotation of shaft 310 causes revolving of hub 334, to reciprocate crank 330, and thereby advance the dog and thus the roller chain and articles thereon, in incremental fashion. The articles are held down in position when so advanced by a hold-down member 340 suspended from support 342 (FIG. 2). The ends of the elongated articles are retained and guided by straddling walls 346 and 348 (FIG. 2).

The articles are fed to rotating wheel 26 in spaced intervals by pusher elements 300 of advancing means 36. However, since the articles are normally advanced to the assembly in closely abutting fashion (as illustrated by articles 200′ in FIG. 6), special spacing means is provided. This is achieved by advancing the articles rapidly with a pair of higher speed conveyor belts 350 leading to the roller chain. These belts travel around a pair of drive puleys 354 on shaft 356, and a pair of free wheeling pulleys 358 on shaft 310. Shaft 356 is driven through pulley 360 by belt 362 from a pulley 364 mounted on shaft 310. The differential in diameter between pulleys 360 and 364 obtains the necessary speed differential of article separating belts 350 and article advancing roller chain 302. The power operation of shaft 310 will be described more fully hereinafter.

After the articles are labeled, and each individual article just labeled is in the twelve o'clock position of advancing wheel means 34 as in FIG. 7 and FIG. 5, they are discharged. This may be done by a pair of elongated horizontal discharge rails 270 intersecting the periphery of wheel means 34 in the manner illustrated in FIGS. 1 and 8. As an article is labeled, and wheel means 34 revolves from its twelve o'clock position toward its three o'clock position, the ends of the labeled article 200 contact these spaced straddling rails which pull the article out of the grooves in shoes 196 and cause the article to rest upon these slide rails. In the form of the construction illustrated in FIG. 1, a pair of article contacting, revolving upper friction belts 370 are continuously driven to advance the labeled articles 200 along the slides 270 to discharge them, e.g., article 200′ in FIG. 1, from the machine to a suitable container or conveyor (not shown). The pair of spaced belts 370 are mounted on spaced pulleys, e.g., 372, which are driven through a belt connection 374 from an electrical motor 376. It will be understood that the lower slide rails 270 may also be substituted or supplemented by a second set of drive belts beneath the articles in addition to upper drive belts 370 above the articles.

The power drive for all of the operative interrelated components and subassemblies of this apparatus is preferably obtained from a single electrical motor M (FIG. 3) housed in the lower part of the assembly.

The electrical motor M provides driving power to all of the operating elements of the assembly. It operates a continuously rotating, upper, transverse drive shaft 240, which in turn drives intermittently moving, lower, transverse drive shaft 241. Shaft 240 is driven directly from motor M by a roller chain 400 (FIGS. 2 and 3) to sprocket 402 and shaft 240. As noted previously, cams 232, 224 and 230 are mounted on this shaft 240 to be continuously rotated, for operating the reciprocable motions of the fingers and label holder of the label applicator means 26. Also mounted on this shaft is cam mechanism 298 and cam mechanism 256 to cause lateral reciprocation of wiper 218 and its hoisting and lowering motion. Also mounted on this shaft is the continuously rotating, roller containing drive member 410 of a conventional Geneva drive, with its rollers 412 (FIG. 3) intermittently drivingly engaging with the radially slotted drive hub member 414. This hub member is mounted on lower shaft 241, thereby causing the intermittent drive motion of shaft 241.

Upper shaft 240 also has a pulley 450 which drives timing belt 452 (FIGS. 2 and 3), which drives another pulley 454 to a right angle drive, single input, dual output gear box 456. One output shaft 458 drives a belt 460 to the lubricant pump subassembly 462 (FIG. 2) for the system. The other output shaft 464 drives a belt 466 that powers shaft 310 to the article advancing subassembly 36.

A vacuum pump subassembly (not shown) is also utilized to provide a negative pressure for conduit 480 (FIG. 1) to the label advancing hub subassembly 24 and for conduit 142 to the transfer arm subassembly 22 (FIG. 12).

The lower intermittently rotating drive shaft 241 intermittently synchronously drives both label advancing hub assembly 24, and article advancing and positioning wheel subassembly 34.

Label advancing hub subassembly 24 is directly driven from shaft 241 in intermittent fashion by a timing belt 600 (FIG. 3) that extends around pulley 602 on shaft 241, extends around a roller guide 606 (FIG. 2) and around a pulley 608 on shaft 610 that rotationally mounts label advancing hub subassembly 24. Intermittent rotation of article advancing wheel subassembly 34 is obtained through a bevel gear 500 (FIG. 3) mounted on shaft 241, and intermeshing with a second bevel gear 502 at right angles thereto, mounted on shaft 190 (FIG. 5) which drives wheel subassembly 34.

The operation of the cut off means, transfer arm means, and the drive input for the label tape feed are also obtained from shaft 240. Specifically, shaft 240 drives pulley 519, belt 520 (FIG. 4), pulley 524 (FIGS. 4 and 15), and shaft 522. On this shaft 522, rotationally supported between upright support plates 530 and 532, is mounted cam 540 operating the vacuum supply, pneumatic control valve 542 to the transfer arm, cam 544 operating an electrical switch 546 which activates the photo-electric sensor 70 during a relevant portion of the operating cycle, and cam 548 operating electrical switch 550 (FIGS. 2 and 15) which serves as a basic control to actuate clutch-brake unit 66 during a predetermined part of the machine cycle.

Mounted on the extended end of shaft 522, opposite its drive pulley 524, is pulley 556, which drives belt 558, to drive pulley 560 mounted on adjacent shaft 116. As previously noted, the cutter operator cam 108, and transfer arm operating cam 132 are mounted on this shaft 116. In addition, mounted on the extended end of shaft 116 is a conventional adjustable eccentricity, rotational slotted crank 570 (FIGS. 4 and 15) which drives a connecting rod 572 in reciprocable motion. The opposite end of connecting rod 572 is pivotally mounted to an arcuate gear sector 576 mounted on pivot shaft 578 and having gear teeth on its outer arcuate surface intermeshing with a spur gear 580. This spur gear is mounted on the input shaft 582 of the magnetically operated clutch-brake unit 66. The unit operates in conventional fashion to engage as a clutch and cause rotation of input shaft 582 to be applied to the output shaft 586 when the gear sector and gear move in one rotational direction, and to allow free wheeling of the input shaft in the opposite rotational direction by disengaging as a clutch, while preventing output shaft 586 from rotating in this opposite direction by the braking function of the unit. This clutch disengagement-brake engagement function of this conventional clutch-brake unit is actuated by an electrical impulse signal from sensor 70. The result is a controlled intermittent motion in a constant rotational direction for output shaft 586. This intermittent motion is applied to belt 64, which drives label feed advancing roll 60. In the completed machine, elements 576, 580, 572 and 574 are conveniently covered by housing cover 571 (FIG. 1).

In actual operation, therefore, briefly the label tape is pulled from the reel subassembly 14 by the tape advancing subassembly 18 (FIG. 4) in intermittent controlled fashion, causing the individual sections of label tape to project controlled amounts beyond the cutter blades of cutter subassembly 20, the amount of projection being controlled by the controllably braked intermittent drive of the advancing tape in response to the photoelectric sensor signal of controller subassembly 16 to the electromagnetic drive unit 66. The labels are thereby severed very accurately along the edge of their repeat print pattern. The extending end of the tape is also held by vacuum of arm subassembly 22 during cut off, and, when severed, they are individually transferred by the vacuum gripping surface of the vertically reciprocating transfer arm subassembly 22, and deposited on a pair of temporarily stopped, spaced heater plates 150 of label advancing hub subassembly 24. The labels are then heated while advanced through intermittent steps to the six o'clock position of the hub, from the twelve o'clock position, to be positioned exactly with respect to an article advanced upwardly to this position by rotating wheel subassembly 34. At this time the label applicator holder, bending fingers and wiper apply the heated label and, with successive rotation of wheel subassembly 34, the labeled article is discharged onto glides 270 and advanced by belt advancing means 38 out of the machine. The containers which are to be labeled are advanced to the wheel subassembly 34 by the intermittently moving article advancing subassembly 36.

The actual operation of the mechanism is initiated by suitable electrical control switch box assembly 700 (FIG. 2) to start motor M which drives all of the components in interrelated fashion.

The controlled feed of the label tape is very accurate. No notching, slotting or other mechanical indexing of the label tape is necessary. The length of the individual printed labels longitudinally of the tape can be varied in practically unlimited fashion while still achieving complete accuracy of severing and positioning. Sensor 70 detects a particular reflective surface differential on the label tape, to electrically actuate unit 66 to control starting and stopping of the label tape fed in relationship to the reciprocating action of cutter blade 102. Varying length individual labels can be readily accommodated because the sensor will actuate only at the predetermined spot on each label. Since the particular spacing relationship of sensor 70 to cutter blade 102 determines the timing of the cut off, adjustment of this relationship can be accommodated merely by rotating knob 84 to raise or lower and therefore adjust the sensor longitudinally of the tape, and thereby adjust the exact cut off position of each label with extreme accuracy, even while the machine is operating. This is in sharp contrast to previous constructions where the label notched tape passes around a specifically selected index wheel, so that adjustment variations had to be made by trial and error adjustment of an/or substitution of the index wheel. The novel adjustment is therefore not only convenient and time saving, but also hightly adaptable and extremely accurate. Accuracy of label cut off is important to excellent labeling. However, accuracy of label application is dependent upon exact control of label positioning through all of the succeeding operational stations. Accuracy of the novel machine is greatly improved as a result of the fact that cutting, transfer, positioning and application of the labels are all achieved while the feeding and handling components of the tape, labels, and articles are stationary. Specifically, the label tape is temporarily halted in its movement during the cut off operation and the pick up of the severed label by the elevated transfer arm subassembly 22 immediately therebeneath. (The vacuum, of course, is applied to the elongated recessed evacuation ports 138 (FIG. 13) of this arm just as the label is severed, as controlled by cam 540 which operates the pneumatic switch 542 controllnig the vacuum to this arm.) Then as the retained label is lowered so that its edges contact the inner edge surface portions of heater plates or shoes 150, (vacuum being released from the transfer arm and applied to the passages in the hub and heater blocks to pick up the label), and transferred from the arm to the heater blocks, the hub assembly 24 and thus blocks 150 are stationary to achieve exact alignment of the lowering label therewith.

After the label transfer, the transfer arm moves below the level of the heater surfaces of the spaced blocks while hub 24 rotates one segment of its revolution, so as to allow the label to pass the arm before the arm raises again.

Figure 10A:
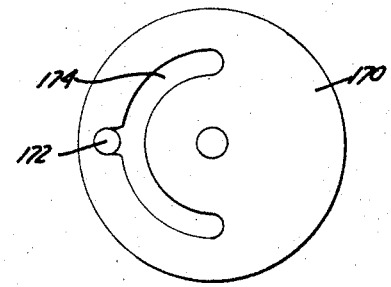
FIG. 10A is an elevational view of the control valve on the hub subassembly in FIG. 10, taken on plane XA—XA.

The labels are retained flat on the plates, even though they are traveling around the periphery of a rotational hub assembly. This flat orientation helps to maintain high accuracy of positioning. When the heated label reaches its lower six o'clock position, with its outer edges now heated to an adhesive state, the hub again is stationary during transfer of the label from the plates as the vacuum is released under the control of valve 170 (FIG. 10A) when holding finger 212 lowers to press the center of the label down onto the surface of the accurately positioned, temporarily stationary elongated article 200. As this transfer occurs, both hub subassembly 24 and article positioning wheel subassembly 34 are heated. Immediately after this transfer, folding finger 214 shifts downwardly to fold one end of the label down the side of container 200, and wiper 218 moves thereacross to wipe the adhesive lower edge beneath the container to adhere it. Then, when wiper 218 is in the position 218' (FIG. 7), finger 216 is lowered to fold the opposite overlapping end of label L5 down, with retraction of the wiper back across the label causing this end to also be adhered. The label application is thereby completed.

With discharge of the labeled article on guides 270, intermittently shifting article advancing means 36 has shifted another container into wheel subassembly 34 in its nine o'clock position as shown in FIG. 7, so that 90° rotation of the wheel subassembly will position the next container for labeling with the next label.

Since the label is heated through several intermittent cycles as it passes from its twelve o'clock position to its six o'clock position, a low temperature can be employed to raise the adhesive material to its adhesive state, while assured heating is obtained. It will also be noted that none of the softened adhesive can be drawn into the evacuation ports in the plates or in the transfer arm because the adhesive is on the opposite side to that contacted by these elements.

It is entirely conceivable that the unique combination presented herein, as well as the unique versatile and highly controllable and adjustable label tape feed control system, the unique label transfer from the cut off to the rotating heater wheel subassembly, the unique hub advancing and heater means in combination with the article positioning means, the unique article infeed and discharge means, could individually be varied in details of construction within the inventive concept presented herein. Indeed, while the illustrated form of the invention is the preferred form, and has been found to be extremely accurate with respect to labeling elongated articles such as toothbrush containers, variations in the type of labels to be applied, e.g. spot labels rather than wrap around labels, variation in the size of the labels to be applied, variations in the article dimensions or configurations, or in the labeling of surfaces on a web rather than on articles, might require obvious minor changes in equipment construction, within the concepts presented, to accommodate the particular usage to which the apparatus is to be adapted. Hence, it is intended that the invention should be limited only by the scope of the appended claims and the reasonably equivalent structures to those defined therein.

I claim:

1. A labeling machine comprising: means for intermittently feeding and means for guiding a continuous tape of repeat pattern labels in a predetermined path; label cut off means forming a label cut off station positioned to receive a label tape from said feeding means, and shiftable to cut individual labels from the tape; photoelectric pattern detection and label tape feed control means including sensor means operably oriented toward said path to detect individual repeat label prints, and controllably asociated with said feeding means to accurately control the intermittent feed in relation to operation of said cut off means, to cause accurate cut off of individual labels on the repeat pattern; an intermittently rotatable, individual label retaining, heating, advancing, and positioning drum means having a plurality of label retention and heater devices around its periphery; said devices being shiftable with said drum between rotational stations including a label pick up station adjacent said cut off station, intermediate stations, and a label applicator station; label transfer means shiftable between said cut off station and said pick up station; means to intermittently advance article surfaces to be labeled to said applicator station and from said applicator station; means for transferring individual heated labels from said devices at said applicator station and applying them to advanced surfaces; and intermittent power drive means to said drum means and said article surface advance means operably synchronized to simultaneously hold both means temporarily stationary during transfer of the label from said drum means to article surfaces.

2. The machine in claim 1 wherein said devices each comprise a pair of heater shoes spaced from each other to engage only the edges of each label, and including vacuum retention means, said transfer means comprises a shiftable arm having a suction label retention surface shiftable reciprocally between one position at said cut off station to receive a label, and another position between a pair of heater shoes at said pick up station to transfer the label to said shoes, and means to release the vacuum on said arm substantially with application of vacuum to the pick up pair of heater shoes.

3. A labeling machine comprising: means for feeding and means for guiding a continuous tape of repeat pattern labels in a path; label cut off means forming a label cut off station and positioned to receive a label tape from said feeding means, and shiftable to cut individual labels from the tape; a rotatable individual label heating, advancing, and positioning drum means having a plurality of pairs of spaced label vacuum retention and heater plates around its periphery forming a space between each pair for contacting only the edges of a label; said shoes being shiftable intermittently with said drum means between rotational stations including a label pick up station adjacent said cut off station and a label applicator station; label transfer arm means having a vacuum label retention surface area shiftable between said cut off station to a position between each pair of shoes at said pick up station; means to advance article surfaces to be labeled to said applicator station; and means for removing individual heated labels from said plates at said applicator station and apply them to article surfaces.

4. A labeling machine for applying adhering labels to elongated articles, comprising: article advancing means; label applicator means at one portion of said article advancing means to form an applicator station; label heating and intermittent movement drum advancing means operably associated with said applicator means to feed heated labels thereto and stop temporarily thereat; intermittent drive means drivingly connected to said label advancing means to intermittently temporarily stop said label advancing means at said applicator station; said article advancing means including recirculating article pushing feed means and a rotary, radially slotted article positioning wheel having a plurality of radial slots operably associated with said article pushing means to receive articles one at a time from said article pushing means and advance them to said applicator station; intermittent drive means connected to said wheel to temporarily stop it with said slots aligned to receive an article from said pushing means and aligned at said applicator station with said label advancing means.

5. The machine in claim 4 wherein said wheel includes a pair of spaced rims having a plurality of removable article carrier inserts around their periphery forming said slots with a selected configuration to receive the ends of elongated articles.

6. The machine in claim 4 wherein said article pushing means includes a plurality of spaced, recirculatory, positive advancing, individual article pushing elements movable to the periphery of said wheel to load articles one at a time into said slots.

7. The machine in claim 6 wherein said article pushing means has intermittent drive means operably connected thereto.

8. The machine in claim 6 wherein said article pushing means includes an article separating conveyor leading to said pushing elements, and operably driven to advance articles at a different rate than said pushing elements to space the articles between said pushing elements.

9. The machine in claim 6 including labeled article receiving and advancing surface means intersecting the peripheral circumference of said wheel to cause articles to be pulled from said slots with rotation of said wheel.

10. The machine in claim 9 wherein said surface means includes driven article engaging friction belt means.

11. A labeling machine comprising: means for feeding and means for guiding a continuous tape of repeat pattern labels in a path; label cut off means forming a label cut off station and positioned to receive a label tape from said feeding means, and shiftable to cut individual labels from the tape; photoelectric pattern detection and label tape feed control means operably associated with said guiding means to detect repeat label patterns, and controllably connected with said tape feeding means to cause accurate cut off of individual labels on the repeat pattern; a rotatable individual label heating, advancing, and positioning drum means having a plurality of label retention and heater shoe devices around its periphery; said devices being shiftable with said drum between rotational stations including a label pick up station adjacent said cut off station and a label applicator station; label transfer arm means shiftable between said cut off station and said pick up station; means to advance surfaces to be labeled to said applicator station and from said applicator station; means for removing individual heated labels from said devices at said applicator station and apply them to advanced surfaces; intermittent drive means drivingly connected to said label advancing means to intermittently temporarily stop said label advancing means at said applicator station; said article advancing means including recirculating, article pushing means and a rotary, peripherally grooved article receiving wheel having a plurality of radial grooves to receive articles from said article pushing means; intermittent drive means connected to said wheel to stop it with said slots aligned to receive an article from said pushing means, and aligned at said applicator station with a label on said devices, to allow accurate transfer therebetween.

12. A labeling machine comprising: means for feeding and means for guiding a continuous tape of repeat pattern labels in a path; label cut off means forming a label cut off station positioned to receive a label tape from said feeding means, and shiftable to cut individual labels from the tape; photoelectric pattern detection and label tape feed control means operably associated with said path to detect repeat label patterns, and controllably connected with said feeding means to cause accurate cut off of individual labels on the repeat pattern; said photoelectric means including a sensor oriented toward the label tape path, and mounted on movable support means; adjustment means connected to said support means and operable to shift said sensor axially along said path to obtain selected registry of a tape repeat pattern with said cut off means, and connected to shift said sensor transversely of said path to correlate it with a selective print portion of the repeat label pattern; a rotatable individual label heating, advancing, and positioning drum means having a plurality of pairs of spaced label retention and heater shoes around its periphery; each of said shoes having vacuum retention surface means; said pairs of shoes being shiftable with said drum means between rotational stations including a label pick up station adjacent said cut off station and a label applicator station; means to cause vacuum application to each pair of shoes at said pick up station and release at said applicator station; label transfer arm means shiftable from said cut off station to a position between a pair of shoes at said pick up station; said arm means including a vacuum retention surface means; control means to cause vacuum application to said arm means at said cut off station and release at said pick up station; means to advance article surfaces to be labeled to said applicator station, and labeled article surfaces from said applicator station; means for removing individual heated labels from each pair of said shoes at said applicator station and apply them to advanced surfaces; intermittent drive means drivingly connected to said label advancing means to intermittently temporarily stop said label advancing means as each pair of shoes is aligned at said applicator station; said article advancing means including recirculating, article pushing means and a rotary, radially slotted article receiving wheel having a plurality of radial slots to receive articles from said article pushing means; intermittent drive means connected to said wheel to stop it with said slots aligned to receive an article from said pushing means and aligned with a pair of shoes at said applicator station.

13. A labeling machine comprising: label feed means for intermittently feeding a continuous tape of repeat pattern labels in a path; powered label cut off means forming a label cut off station positioned to receive successive portions of a label tape from said feeding means, and shiftable to cut individual labels from the tape; and said label feed means including label tape engaging and advancing means operably connected to and driven from one-direction-drive rotary magnetic clutch brake means which in turn is operably connected to and driven from rotationally reciprocable gear sector means connected through reciprocating drive means to power motor means; and means to advance the cut labels and apply them to surfaces to be labeled.

14. The labeling machine in claim 13 wherein said reciprocating drive means includes a crank drive means for converting on direction rotational movement into reciprocating movement.

15. The labeling machine in claim 13 wherein said cut off means is operably actuated to cut off labels as said gear sector has rotationally reciprocated in the label feed direction.

16. A label machine comprising: means for intermittently feeding and means for guiding a continuous tape of repeat pattern labels in a predetermined path; label cut off means forming a label cut off station positioned to receive a label tape from said feeding means, and shiftable to cut individual labels from the tape; photoelectric pattern detection and label tape feed control means including sensor means operably oriented toward said path to detect individual repeat label prints, and controllably associated with said feeding means to accurately control the intermittent feed in relation to operation of said cut off means, to cause accurate cut off of individual labels on the repeat pattern; an intermittently rotatable, individual label retaining, heating, advancing, and positioning drum means having a plurality of label retention and heater devices around its periphery; said devices being shiftable with said drum between rotational stations including a label pick up station adjacent said cut off station, intermediate stations, and a label applicator station; label transfer means shiftable between said cut off station and said pick up station; means to intermittently advance article surfaces to be labeled to said applicator station and from said applicator station; means for transferring individual heated labels from said devices at said applicator station and applying them to advanced surfaces; drive means operably connected to said tape feeding means, to said label cut off means, to said label transfer means, to said drum means, and to said article advancing means; and control means operably associated with said drive means to cause said tape feeding means to be stationary during actuation of said cut off means, to cause said label transfer means to be stationary during pick up thereby of a cut label at said cut off means, to cause said label transfer means and said drum means to be stationary during transfer of a label therebetween, and to cause said drum means and said article surface advancing means to be stationary during application of labels to the article surfaces, to maintain accurate registry of the labels at all times.

References Cited

UNITED STATES PATENTS

| | | | |
|---|---|---|---|
| 2,657,816 | 11/1953 | Everett | 156—567 XR |
| 2,687,820 | 8/1954 | Rothmann et al. | 156—361 XR |
| 3,112,238 | 11/1963 | Caldwell et al. | 156—499 |
| 3,140,214 | 7/1964 | Von Hofe | 156—354 |
| 3,208,567 | 9/1965 | Metzger | 192—12 |

EARL M. BERGERT, *Primary Examiner.*

D. J. FRITSCH, *Assistant Examiner.*

U.S. Cl. X.R.

156—361, 499, 521, 567

UNITED STATES PATENT OFFICE
CERTIFICATE OF CORRECTION

Patent No. 3,451,874 June 24, 1969

William H. Solomon et al.

It is certified that error appears in the above identified patent and that said Letters Patent are hereby corrected as shown below:

Column 1, line 31, "severing the tap into" should read -- severing the tape into --. Column 4, line 28, "3,208,566" should read -- 3,208,567 --. Column 8, line 7, "puleys 354 on shaft 356," should read -- pulleys 354 on shaft 356, --.

Signed and sealed this 21st day of April 1970.

(SEAL)
Attest:

Edward M. Fletcher, Jr.

Attesting Officer

WILLIAM E. SCHUYLER, JR.

Commissioner of Patents